United States Patent [19]

Nagase

[11] Patent Number: 5,257,152
[45] Date of Patent: Oct. 26, 1993

[54] DISK DRIVE APPARATUS HAVING A SPINDLE PERMITTING A THINNER DISK DRIVE

[75] Inventor: Fumio Nagase, Tama, Japan

[73] Assignee: TEAC Corporation, Tokyo, Japan

[21] Appl. No.: 738,454

[22] Filed: Jul. 31, 1991

[30] Foreign Application Priority Data

Aug. 3, 1990 [JP] Japan .................. 2-206025

[51] Int. Cl.⁵ .................................. G11B 17/02
[52] U.S. Cl. .................. 360/99.08; 360/99.04; 360/99.12; 369/258; 369/270; 369/271
[58] Field of Search ............. 369/270, 271, 264, 263, 369/258, 75.2; 360/99.12, 99.08, 99.05, 99.04, 98.08, 98.07

[56] References Cited

U.S. PATENT DOCUMENTS 4,040,089 8/1977 Guarracini ...................... 369/270
4,878,139 10/1989 Hasegawa et al . ............. 360/99.06

FOREIGN PATENT DOCUMENTS 0001362 1/1991 Japan .................. 369/270

*Primary Examiner*—David P. Porta
*Attorney, Agent, or Firm*—Michael N. Meller

[57] ABSTRACT

The disk apparatus comprising a driving pin to be inserted in a driving hole provided on a hub of a disk, for rotating and driving the disk, a spindle to be inserted in a chucking hole provided at a center of said hub of said disk, and a drive source for rotating said driving pin and said spindle. The spindle has contact portions which contact at two positions an inner side of an inner wall of the chucking hole, the spindle being provided with the contact portion on an outer circumference of the spindle to position the disk, and a tip provided with an inclined surface from a height corresponding to a height of said chucking hole to a position having a height lower than the height of the chucking hole, the contact portions having a height substantially corresponding to the height of the inner wall of the chucking hole.

5 Claims, 5 Drawing Sheets

DISK DRIVE APPARATUS HAVING A SPINDLE PERMITTING A THINNER DISK DRIVE

BACKGROUND OF THE INVENTION

The present invention relates to a disk drive mechanism, and more particularly, to a disk drive apparatus which can be made thinner than conventional ones.

Generally, a 3.5″ flexible disk medium (hereinafter called a "disk") 1 has a disk main body 2 with a metallic hub 3 provided in the center thereof as shown in FIG. 1, and the hub 3 has a rectangular chucking hole 4 and an oval shaped locating hole 5 provided on the hub. When the disk 1 is loaded in a disk drive 10, a spindle 6 and a drive pin 7 of the drive apparatus are inserted respectively into the chucking hole 4 and locating hole 5. The spindle 6 and the drive pin 7 are positioned to touch internally the chucking hole 4 and the locating hole 5 respectively with their respective circumferences as shown in FIG. 1. When the drive pin 7 and spindle 6 rotate, the main body 2 is drivingly rotated while being positioned at a rotating center position by the spindle 6 and the drive pin 7.

FIG. 2 shows a sectional view taken along line II—II in FIG. 1. The spindle 6 is rotated by a spindle motor 8 which is comprised of a stator 8a and a rotor 8b. Tables 9a and 9b for mounting the hub 3 of the disk 1 are fixed on the spindle 6. The drive pin 7 is provided on the table 9a. The hub 3 is mounted on top faces 9c and 9d. And a chucking magnet 11 is provided on the table 9a. The chuck magnet 11 maintains the hub 3 in a secure state on the top faces 9c and 9d of the tables 9a and 9b.

The chucking hole 4 has a square shape as shown in FIG. 1 and FIG. 2. The spindle 6 contacts both of two sides of an inner side surface portion 4a of the chucking hole 4. And the spindle 6 has a contact portion 6a whose height A1 is substantially equal to the height of an inner face 4b of the inner side surface portion 4a which contacts the spindle 6. The height A1 is a dimension from the top face 9c to an upper end of columnar surface of an contact portion 6a.

A dome like spherical shaped tip 6b is provided on the contact portion 6a. The tip 6b guides the spindle 6 to the chucking hole 4 as the spindle 6 is being inserted in the chucking hole 4. The height of the tip 6b is indicated as A2 in FIG. 2.

In the case where the disk 1 is to be set into the disk drive 10 having the spindle 6 constructed as described above described, the disk 1 is inserted into disk the drive 10, in a state where a lower disk case plate 1a (where the hub 3 is exposed) is positioned higher than the tip 6b of the spindle 6, till the disk 1 reaches a specified position. When the disk 1 is inserted to the specified position where the chucking hole 4 of the hub 3 corresponds to the spindle 6, the disk 1 drops down, and the spindle 6 is relatively inserted into the chucking hole 4.

In the disk drive 10, as described above, the spindle 6 has the contact portion 6a having the height A1 and the tip 6b having the height A2. Further the disk drive 10 needs a space (A3 shown in FIG. 2) in which the disk 1 can move along a level higher than the tip 6b when the disk 1 is being loaded in the disk drive 10. Accordingly, the conventional disk drive 10 needs a height (axial length) of (A1+A2+A3) in the axial direction of the spindle 6 above the top face 9c, and this factor precludes any disk drive from being made thinner in construction.

SUMMARY OF THE INVENTION

Accordingly, a general object of the present invention is to provide a new and useful disk drive mechanism and a method for manufacturing a spindle to be used therefor in which the above problem of the conventional art is solved.

A more specific object of the present invention is to provide a disk drive which can be made thinner in construction than conventional ones.

These objects of the present invention are accomplished by a disk drive apparatus comprising: a drive pin, for rotationally driving a disk inserted, into a chucking hole provided in a hub of a disk, a spindle for positioning the hub of the disk at a center position, the spindle having a top point positioned at a distal end portion thereof and which is away from the center of rotation of the spindle, and an inclined surface provided from the top point of the spindle to a position lower than a height of an inner side wall portion of the chucking hole and a drive source for rotating the drive pin and the spindle.

DESCRIPTION OF THE PREFERRED EMBODIMENTS

Figure 3A:
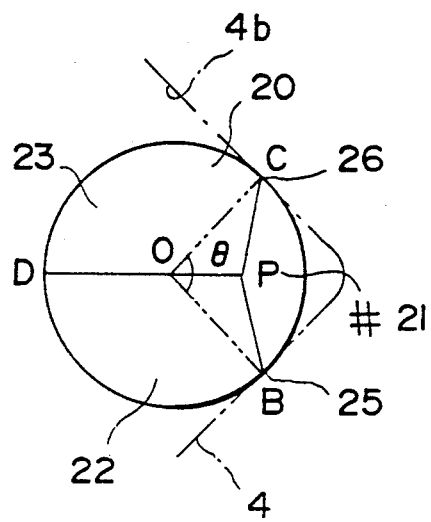
FIGS. 3A-3C are respectively a plan view, a front view and a side view of a first embodiment of a spindle to be used in a disk drive apparatus of the present invention.
Figure 3B:
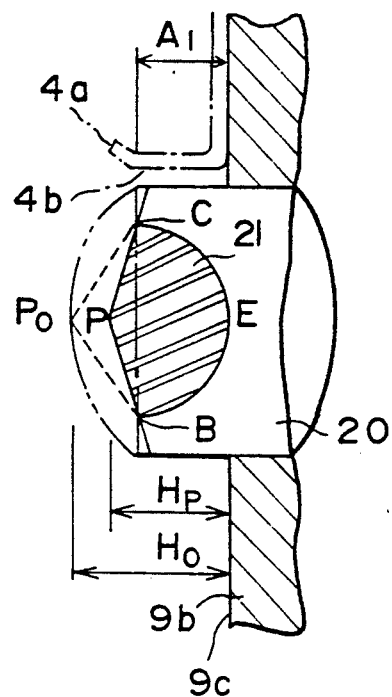
Figure 3C:
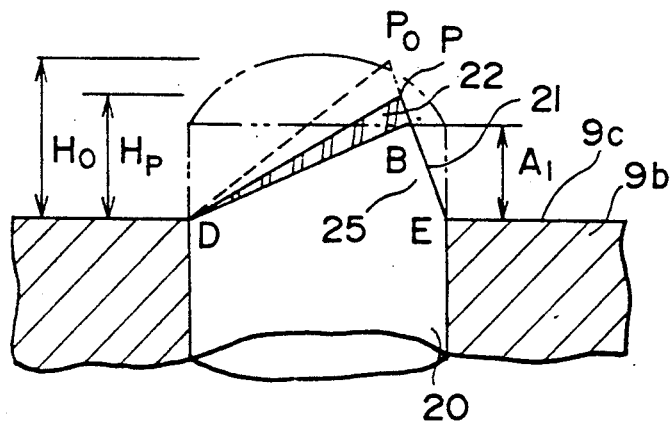

FIGS. 3A-3C show the configuration of a spindle 20 of a first embodiment of a disk drive apparatus of the present invention.

The spindle 20 is comprised of three faces, that is, a face 21 surrounded by straight lines PC, PB and a curved line BC, a face 22 surrounded by straight lines PB, PD and a curved line BD, and a face 23 surrounded by straight lines PC, PD and a curved line CD. A point P is an apex. The spindle 20 has a shape in which a column has been cut by three planes making the three faces 21, 22, 23.

Points B and C in FIG. 3A show the planar sites of contact portions 25, 26 which contact an inner face 4b of an inner wall 4a of the chucking hole 4. As mentioned before, the spindle 20 internally touches the two sides of the chucking hole 4 which are adjacent to each other, so that an angle θ formed by points B and C and a center point (axis) O of the spindle 20 will be 90 degrees.

In order to make the disk be properly positioned by the cooperation of the spindle 20 the chucking hole 4 as described above, the spindle 20 should have an outer surface portion having the height A1 as a reference contact portion. As shown in FIG. 3B, the points B and C are accordingly positioned of a height corresponding to the height A1 shown in FIG. 2 above the top face 9c of the table 9b. As a result, the points between the point B and the Point C on the outer circumference of the spindle 20 and the top face 9c of the table 9b will be the reference contact portions 25 and 26 which contact the two sides of the inner wall of the chucking hole 4 of the present embodiment. Further, for reference, the shape of the conventional spindle 6 is shown by using two-dotted chain lines in FIG. 3B and FIG. 3C.

The apex P is on a line which passes through the center point O and divides equally the angle $\theta$, and is located between the center point O and a line connecting the point B with the point C. The point where a line extending from a straight line PO intersects with the outer circumference of the spindle 20 is designated as a point D, and is located so as to be aligned with the top face 9c of the table 9b when viewed from a side face of the spindle 20.

The height $H_p$ on the top face 9c of the apex P is set a little higher than the height $A_1$ of the point B and point C. The face 22 and the face 23 form a ridge along the line DP. The face 21 has an inclined plane including the points P,B,C and a point E. The point E is at the bottom of the inclined plane and is aligned with the top face 9c of the table 9b.

Figure 1:
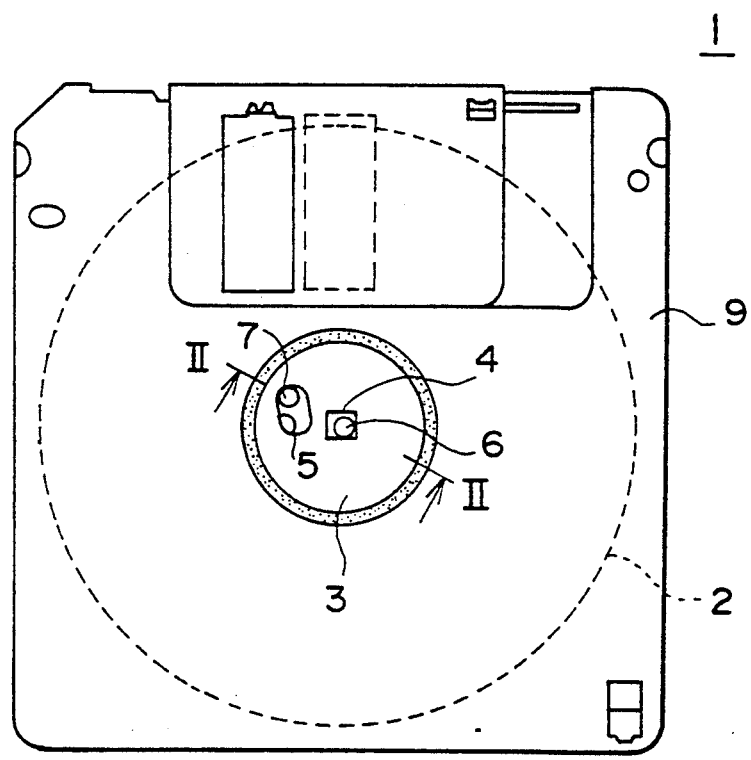
FIG. 1 is a general example showing a plan view of a 3.5 inch flexible disk loaded in a conventional disk drive mechanism.
Figure 2:
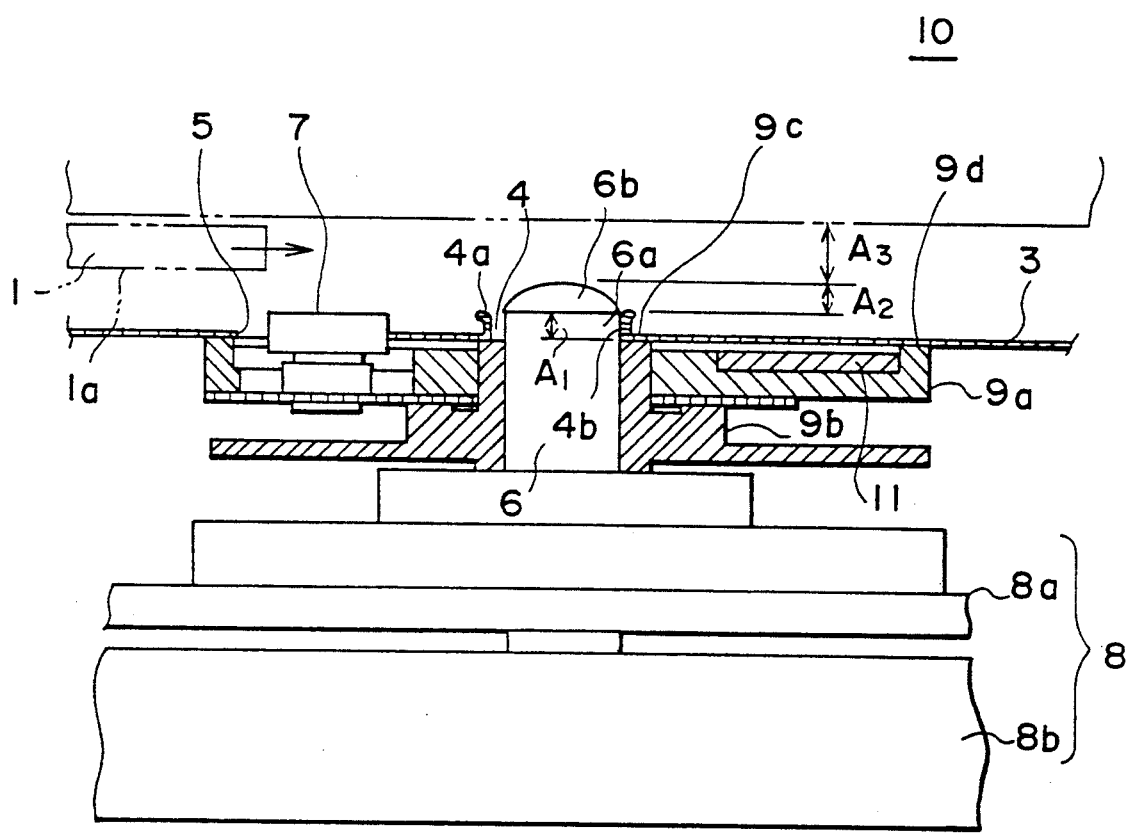
FIG. 2 is a sectional view taken along line II—II in FIG. 1 showing the conventional disk drive mechanism.
Figure 4:
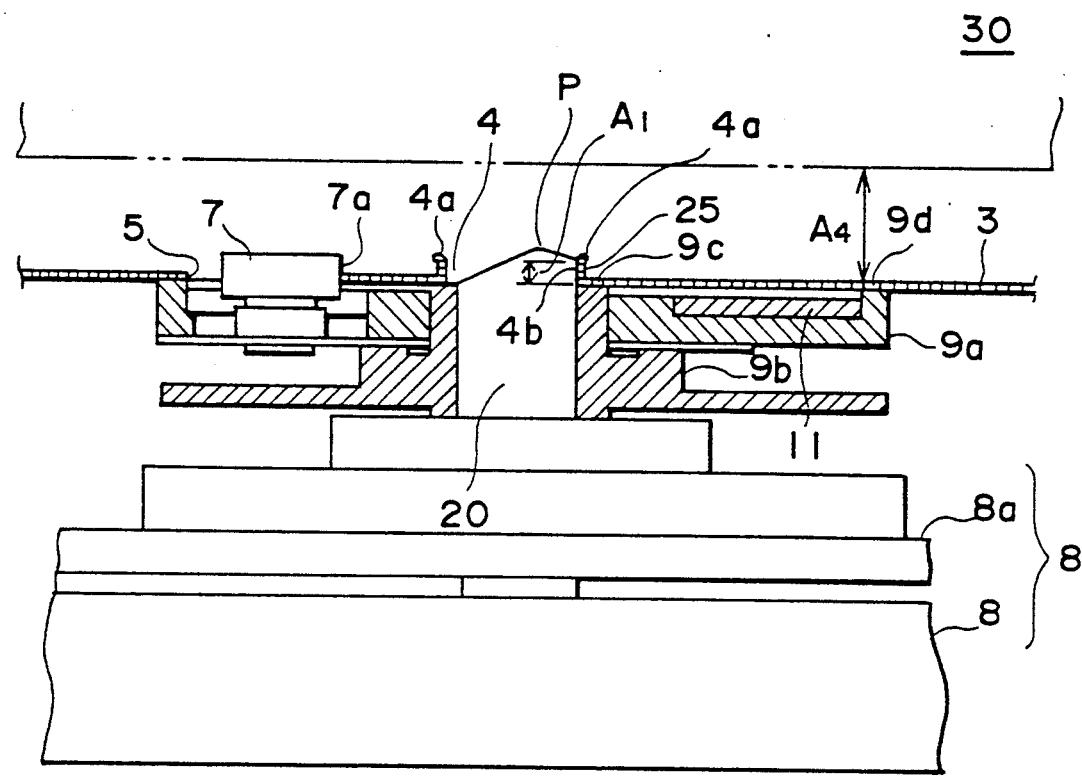
FIG. 4 is a sectional view similar to FIG. 2, showing the disk drive apparatus of the present invention provided with the spindle in FIG. 3.

FIG. 4 shows a sectional view of a disk drive apparatus 30 according to the present invention provided with the spindle 20 in FIG. 3. The a disk drive apparatus 30 shown in FIG. 4 has the same construction as the conventional disk drive apparatus 10 except for the shape of the spindle. Those parts which correspond to the parts as shown in FIG. 2 are given the same reference numerals and a further description thereof will not be given.

As shown in FIG. 4, the spindle 20 having the construction as mentioned above is inserted in the chucking hole 4, and the contact portions 25 and 26 (the contact portion 26 is not shown) contact the inner face 4b of the chucking hole 4 when the disk 1 is loaded in the disk drive apparatus 30. The drive pin 7 provided at the table 9a is inserted in the driving hole 5. Accordingly, the disk body fixed at the hub 3 is driven and rotated as the drive pin 7 and the spindle 20 are rotated by means of the spindle motor 8. During rotation, the disk body is centered by the rotating drive pin 7 and the spindle 20.

A description of the advantages of the shape of the spindle 20 will be explained herein below.

The conventional spindle is indicated by the two dotted chain line in FIG. 3B and FIG. 3C. The tip of the conventional spindle has a height of $H_o$ as measured from the top surface 9c of the table 9b. A dotted line shows the tip of the spindle having inclined planes according to the present invention, it being assumed that an apex $P_0$ thereof has the same height as the height of $H_o$.

As is seen from FIG. 3B and FIG. 3C, the shape of the spindle 20 is sharp and has a much more acute angle than the conventional spindle if the spindle 20 has the same height $H_o$ as the conventional spindle. This is because the spindle 20 of the present embodiment is provided with an inclined part at a height which correspond that of the chucking hole 4 and the contact portions 25 and 26, while the inclined part 6b of the conventional spindle is provided above the contact portion 6a which comes into contact with the chucking hole 4.

With respect to a guiding function of the inclined part of the spindle for the chucking hole 4, the degree of steepness of the inclined part of the conventional spindle 20 is sufficient to perform the guide function. As a result, it is unnecessary for the tip of the spindle 20 to have an angle more acute than that of the tip of the conventional spindle. The spindle 20 with the tip having the apex P and the conventional spindle with the tip having the apex $P_0$ has the same guiding effects, even though the height $H_p$ of the apex P is lower than the height $H_o$.

Accordingly, the apex P of the spindle 20 of the present embodiment is, as mentioned above, reduced in height so as to have a height corresponding to that of the conventional one. Due to the shape of the spindle 20 having the apex P, the same contacting functions of the contact portions 25, 26 for the chucking hole 4 and the same guiding function for the chucking hole 4 as those of the conventional spindle are attained. In addition, the height $H_p$ of a portion of the spindle 20 projected from the top surface 9c of the table 9b can be lower than the conventional height $H_o$. As a result, the height A4 of the disk 1 to be loaded into the disk drive apparatus can be lower than the conventional height $(A_1+A_2+A_3)$. Use of the spindle 20 of the present embodiment enables the disk drive apparatus to be thinner than the conventional one.

Figure 5:
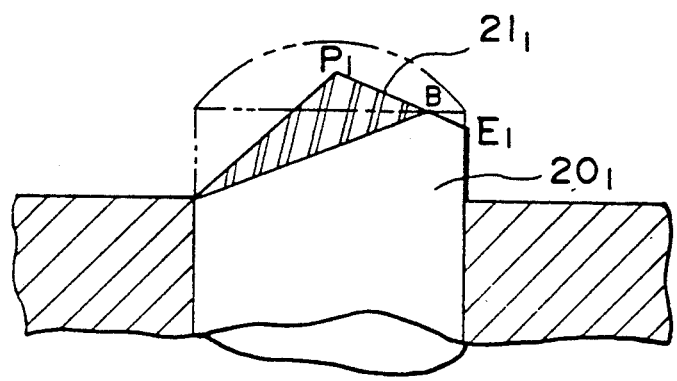
FIG. 5 shows a modification of the spindle according to the present invention.

A modification of the position of the apex P will now be described. FIG. 5 shows the shape of the tip of the spindle 20 having the apex $P_1$ in proximity to the center point O and a height the same as that of the apex P shown in FIG. 3C. When comparing FIG. 3C with FIG. 5, it will be seen that the shape of the tip having the apex P shown in FIG. 3C has the inclined face 21 steeper than an inclined face $21_1$ of the tip having the apex $P_1$ shown in FIG. 5. The steep inclined face 21 will perform a more effective guiding function than the inclined face $21_1$.

Figure 6A:
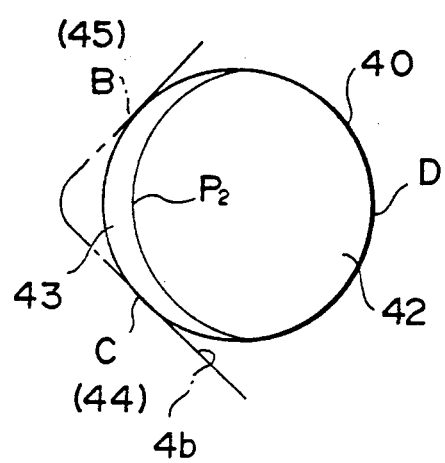
FIGS. 6A-6C are respectively a plan view, a front view and a side view of a second embodiment of the spindle to be used in the disk drive apparatus of the present invention.
Figure 6B:
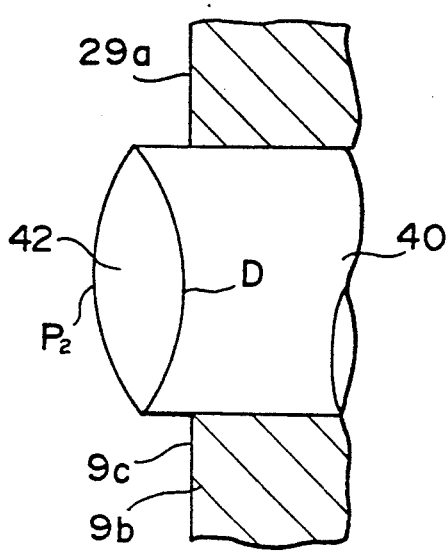
Figure 6C:
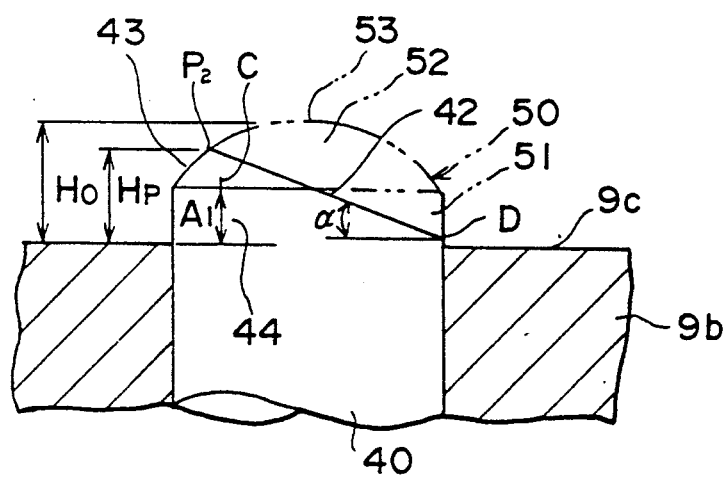

FIGS. 6A–6C show the construction of the spindle of the second embodiment according to the present invention. A spindle 40 is provided with an inclined face 42 at the tip thereof. As shown in FIG. 6C, the inclined face 42 is inclined with an angle $\alpha$ which extends from the a point D at a height equal to or almost equal to that of the top face 9c to a point $P_2$ opposite to the point D.

The point $P_2$ is at a highest top position on a ridge formed by the inclined surface 42 and a round inclined portion 43 having a partly spherical shape.

The shape of the tip of a conventional spindle is indicated by a two dotted chain line in FIG. 6C. The spindle 40 of the present invention has a shape in which a portion of the conventional spindle shown by the two dotted chain line in FIG. 6C is cut and removed. In the spindle 40, when seen from above, has the round inclined portion 43 thereof forms a crescent around the inclination surface 42 as shown in FIGS. 6A and 6C.

Both the inclined surface 42 and round inclined portion of the crescent form perform a guiding function when the spindle 40 is relatively inserted into the chucking hole 4 of the hub 3.

The spindle 40 contacts the inner side 4b of the inner wall 4a of the chucking hole 4 at the points B and C in FIG. 6A. That is, portions of the spindle 40 lower than the points B and C serve as contact portions 44 and 45 of the spindle 40 for the chucking hole.

Therefore, the spindle 40 has the contact portions 44 and 45 a height of $A_1$ which contact the inner side 4b of the chucking hole 4. The height $H_p$ of the highest point $P_2$ is lower than the highest height $H_o$ of the conventional spindle. As a result, the loading level of the disk can be lowered, resulting in the producing of a thinner disk drive apparatus. The spindle 40 can be manufactured by simply forming the inclined surface 42 on the conventional spindle with so that only the contact portions 44 and 45 remain. Accordingly, precise machining is attained and the height $H_p$ from the top face 9c of the table 9b to the highest point $P_2$ can be precisely maintained during mass production.

A method for manufacturing the spindle 40 will now be explained. As shown in FIG. 6C by a two dotted chain line, a conventional spindle 50 having a tip portion composed of a column portion 51 having a height $A_1$ corresponding to the height of the inner side 4b of the chucking hole 4 and a dome portion 52 on the column portion 51 is provided. A tip portion of the spindle 50 shown by the two dotted chain line is cut and removed along a single inclined plane including a point on the dome portion 52 deviated from a top 53 and a point at a position lower than the height $A_1$ on the column portion 51.

The spindle 40 is thus readily produced by the cutting step mentioned above.

The present invention is not limited to the embodiments described above, and various modifications and alternations are possible within the scope of the appended claims.

What is claimed is:

1. A disk drive apparatus comprising:
a drive pin, for rotationally driving a disk, inserted into a chucking hole provided in a hub of a disk; a spindle for positioning said hub of said disk at a center position;
said spindle having a top point positioned at a distal end portion thereof and which is away from a center of rotation of said spindle,
an inclined surface provided from said top point of said spindle to a position lower than a height of an inner wall side portion of said chucking hole; and
a drive source for rotating said drive pin and said spindle.

2. A disk drive apparatus as claimed in claim 1, wherein said disk drive apparatus has a table for mounting said disk thereon, said included surface extending from a top of said spindle tip to a position near to a top surface of said table.

3. A disk drive apparatus as claimed in claim 1, wherein said top point of said spindle is provided with three inclined surfaces and said contact portions are formed at portions on said spindle outer circumference between one inclined surfaces and another inclined surface adjacent to said one inclined surface and between said one inclined surface and the remaining inclined surface.

4. A disk drive apparatus as claimed in claim 1, wherein said top point of a tip of said spindle has a curved inclined surface located at a position higher than said chucking hole, said inclined surface being a single plane which form a ridge with said curved inclined surface.

5. A disk drive apparatus comprising:
a drive pin, to be inserted in a driving hole provided on a hub of a disk, for rotating and driving said disk;
a spindle to be inserted in a chucking hole provided at a center of said hub of said disk; and a drive source for rotating said drive pin and said spindle;
said spindle having contact portions which contact at two positions an inner side of an inner wall of said chucking hole, said spindle being provided with the contact portions on an outer circumference of said spindle to position said disk, and a tip provided with an inclined surface from a position having a height corresponding to a height of said chucking hole to a position having a height lower than said height of the chucking hole, said contact portion having a height substantially corresponding to the height of the inner wall of the chucking hole;
wherein a top portion of the tip of said spindle is provided with three inclined surfaces and said contact portions are formed at portions on said spindle outer circumference between one inclined surface and another inclined surface adjacent to said one inclined surface and between said one inclined surface and the remaining inclined surface.

* * * * *